UNITED STATES PATENT OFFICE.

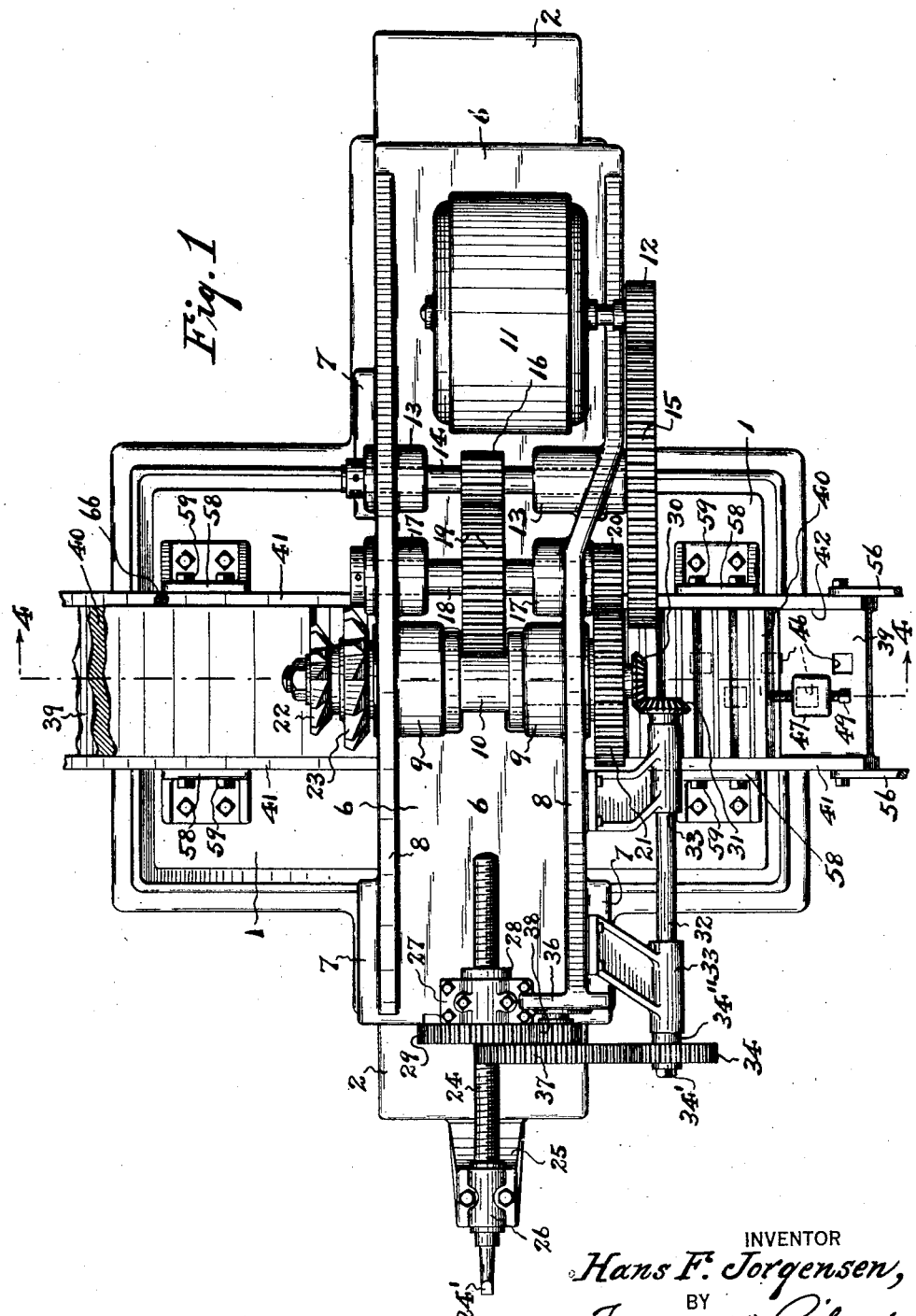

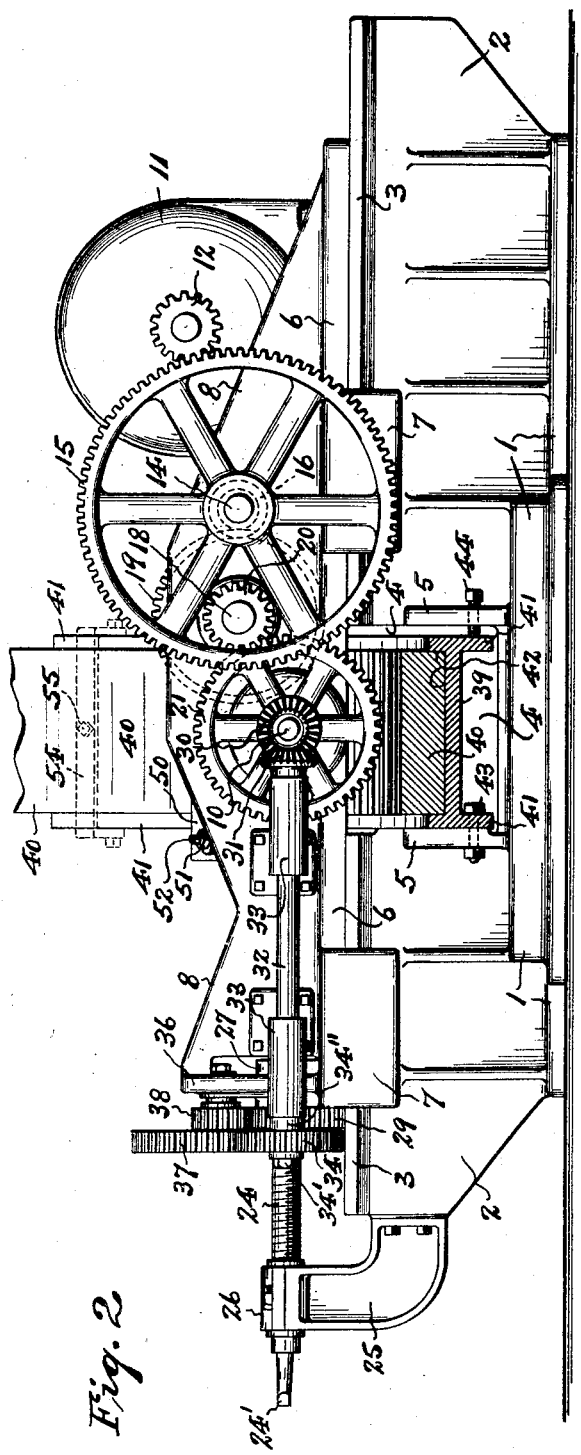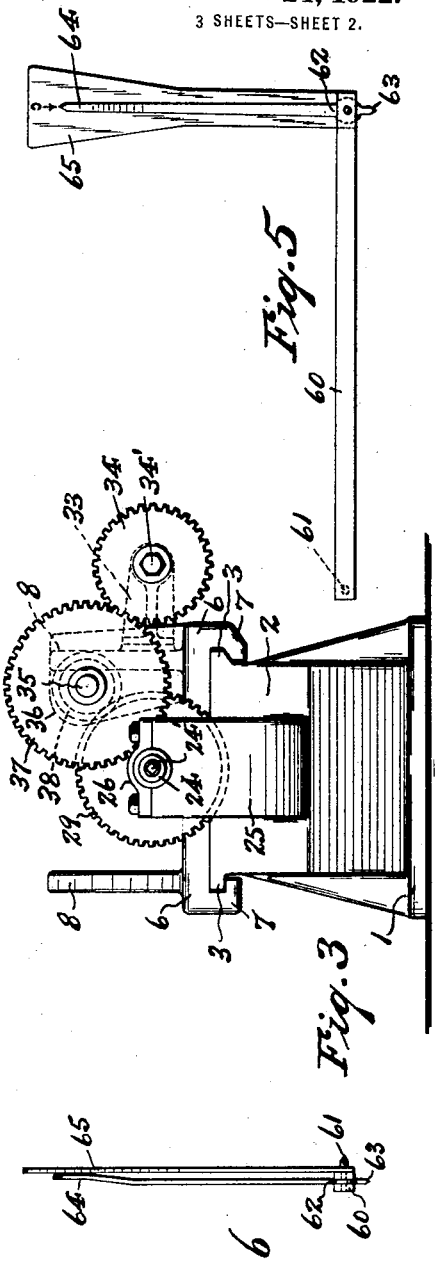

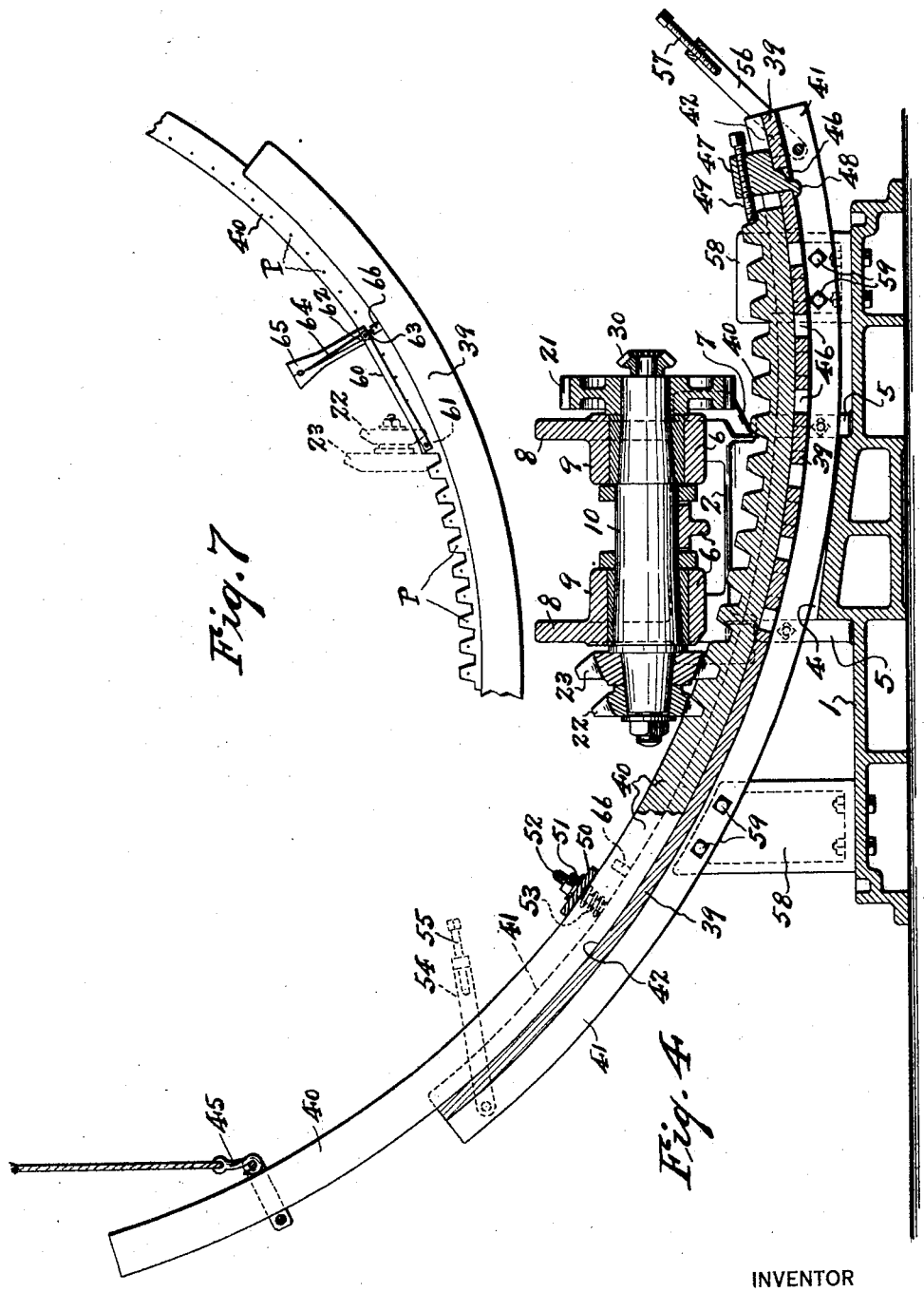

HANS F. JORGENSEN, OF FLORAL PARK, NEW YORK, ASSIGNOR OF ONE-HALF TO JAMES J. MANNING, OF BROOKLYN, NEW YORK.

RACK AND GEAR CUTTING MACHINE.

1,404,205.   Specification of Letters Patent.   Patented Jan. 24, 1922.

Application filed July 6, 1920. Serial No. 394,088.

*To all whom it may concern:*

Be it known that I, HANS F. JORGENSEN, a citizen of the United States, residing at Floral Park, in the county of Nassau and State of New York, have invented certain new and useful Improvements in Rack and Gear Cutting Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in rack and gear cutting machines; and the invention has reference, more particularly, to an improved construction of machine for cutting teeth in straight racks, circular or curvilinear gears or racks, or external gears when made up of segmental sections; and said novel machine is peculiarly adapted to cut racks and gears of the kind specified in very large and heavy sizes.

The invention has for its principal object to provide a construction of gear and rack cutting machine in which a novel and highly efficient means for mounting and controlling the work relative to the cutters is employed, together with a novel arrangement of movable cutter carriage for feeding the cutters in operative relation to the work, all so combined that very large and heavy work can be most efficiently and rapidly accomplished with precise accuracy.

A further object of the present invention is to provide a novel means for supporting the work relative to the cutters which permits of the employment of an unusually large driving gear for the cutter spindle, whereby steadiness and accuracy of the cutter movement is greatly enhanced.

Other objects of the present invention, not at this time more particularly enumerated, will be clearly understood from the following detailed description of the same.

With the various objects of the present invention in view, the same consists, primarily, in the novel construction of the rack and gear cutting machine hereinafter set forth; and, the invention consists, furthermore, in the novel arrangements and combinations of the various devices and parts, as well as in the details of the construction of the same, all of which will be hereinafter more fully described and then finally embodied in the claims appended hereto.

The invention is clearly illustrated in the accompanying drawings, in which:—

Figure 1 is a plan view of the novel rack and gear cutting machine, made according to and embodying the principles of the present invention: Figure 2 is a side elevation of the same; Figure 3 is a detail end elevation of the same, looking toward the carriage feed screw end thereof; Figure 4 is a detail transverse section taken on line 4—4 in said Figure 1; Figure 5 is a face view of a tram used in connection with the operation of setting and shifting the work for the successive gear cutting operations; Figure 6 is an end elevation of said tram; and Figure 7 is a detail side view of a portion of the work supporting saddle or jig with the work positioned therein, and illustrating the method of using the tram for positioning the work for successive cuts, said latter view being drawn on a smaller scale.

Similar characters of reference are employed in all of the hereinabove described views, to indicate corresponding parts.

Referring now to said drawings, the reference-character 1 indicates a base or bed-plate provided with a longitudinally disposed carriage supporting table 2 having at each side outwardly projecting longitudinal guide lips or rails 3, said table is formed intermediate its ends with a transverse gap or seat 4 disposed at right angles to the table. Integrally connected with the bed-plate and table adjoining each end of said gap or seat 4 are anchor flanges 5.

The reference-character 6 indicates a traveling carriage which supports the cutters, transmission and all the moving parts of the machine. Said carriage 6 is supported for reciprocatory traveling movement on said table 2, and is provided on its opposite sides with tracker lugs 7 which pass around and under the guide lips or rails 3 of the table, thus forming a guide to the carriage movement, causing the same to travel longitudinally upon the table, and across the gap or seat 4 of the latter.

Said carriage is provided with upwardly projecting laterally spaced apart longitudinal side frames 8, provided at suitable locations with opposite bearings 9 in which is journaled a transverse cutter spindle 10. Supported upon the rear end of said carriage is an electric motor 11, the shaft of which is provided with a driving pinion 12. Said side frames 8 are further provided, intermediate said cutter spindle and the motor 11 with bearings 13 for journaling a transverse lay shaft 14. Secured upon one end of said lay shaft 14 is a large gear wheel 15 which meshes with said driving pinion 12 of the motor 11, and said shaft 14 is further provided with a pinion or small gear 16. In like manner, said side frames 8 are provided, intermediate said cutter spindle and said lay shaft 14, with additional bearings 17 for journaling a second transverse lay shaft 18. Secured upon said shaft 18, to mesh with said pinion or small gear 16 is a large gear 19, and fixed upon the outer end of said shaft 18 is a pinion or small gear 20 which meshes operatively with a large driving gear 21 fixed upon an end of said cutter spindle 10. Fixed upon the opposite end of said cutter spindle 10 are the milling cutters, which (as shown in the drawings) initially comprise a pair of roughing milling cutters 22 and 23, the outermost cutter 22 being of smaller size than the innermost cutter 23, so that, when producing the roughing cuts in the work, the former mills an initial cut which, when the work is shifted, is positioned so as to be widened and completely roughed out to approximate size by the latter. In practice the work is run through the machine a second time for finishing, in which event the roughing cutters 22 and 23 are removed from the spindle 10 and a single finishing cutter is affixed to the latter, whereby the gear teeth cut in the work are faced off with precise accuracy. The above mentioned train of gears 12, 15, 16, 19, 20 and 21, provide a powerful and smoothly running transmission gearing for driving the cutter spindle and its milling cutters, and the manner of and means for supporting the work relative to the cutters (which will be subsequently more particularly described) renders it possible to employ on the cutter spindle a driving gear 21 of unusually large size, to thus assure steadiness and accuracy in the rotation and operation of said spindle and its cutters.

The means for causing the forward feeding movement of said carriage comprises a feed screw 24, having one end supported in a bracket member 25 which is secured to the end of said table 2. Normally said feed screw is held stationary, i. e. against rotation, by clamping down thereupon a clamp-cap 26 associated with said bracket member 25. The free end of said feed screw projects longitudinally and inwardly over the forward end of said carriage 6. Mounted upon the forward end of said carriage is a bearing member 27 in which is journaled the hub 28 of a driven gear 29, said hub being internally threaded to provide a feed nut adapted to engage said feed screw 24 which passes therethrough, so that when the driven gear 29 and its hub 28 are rotated, the feed nut so provided rides upon the stationary feed screw and thus feeds or draws the carriage forward upon the table 2. The means for rotating said feed nut to produce said forward movement of the carriage 6 comprises a driving bevel gear 30 fixed upon the end of said cutter spindle 10, which meshes with a similar bevel gear 31 fixed upon a feed spindle 32 supported by bearing brackets 33 from a side frame 8 of said carriage, said feed spindle 32 driving a transmission gear train adapted to rotate said driven gear 29. Said transmission gear train comprises a driver gear 34 connected with and driven by said feed spindle 32, and which meshes with an idler reduction gearing supported for rotation on a stud shaft 35 projecting from a supporting bracket 36, said reduction gearing comprising a large gear 37 meshing with said driver gear 34 and a small gear 38 meshing with said driven gear 29. It will thus be apparent that rotation of the cutter spindle 10 not only produces the operative revolutions of the milling cutters, but also through the feed mechanism above described causes the carriage 6 to travel forward to advance the milling cutters across the work.

The reference-character 39 indicates a saddle or jig for supporting the work in operative relation to the machine. In the drawings the machine is shown operating upon a segment 40 of an internal gear or rack, said segment being seated in and rigidly supported by the saddle or jig 39. A saddle or jig 39 of proper size and shape is provided for each size and character of gear or rack to be cut so as to conform thereto, consequently if the rack or gear to be cut is straight or rectilinear, then a straight or rectilinear saddle or jig corresponding thereto is employed; if the rack or gear is curvilinear, then a correspondingly curved saddle or jig is employed. Said saddle or jig 39 is provided with side flanges 41, the upper portions of which project above the upper side or top of said saddle or jig to form in conjunction therewith a longitudinal channel 42 in which the work 40 is seated, while the lower portions of said flanges project downwardly below the under side of said saddle or jig. The saddle or jig is arranged in tilted or inclined position transversely of the machine so as to extend through said gap or seat 4, the same inclining downwardly toward the milling cutters of the machine and thence through said gap or seat 4, being secured in place by bolts 43, which are passed through the anchor flanges 5 at one side of said gap or seat and thence through the lower portions of the adjoining side flange of the saddle or jig, and by means of set screws 44 which pass through the opposite anchor flanges to engage the opposite side flanges of said saddle or jig. As an additional means for securing the saddle or jig immovably in place, there may be provided bracket members 58 which are secured to said base 1 on each side of said saddle and adjacent to each end thereof, and to which said saddle is secured by passing bolts 59 through said bracket members and the side flanges of the saddle. With the saddle or jig thus secured in place, it will be noticed that the axial line of the cutter spindle 10, which is horizontal, is not at a right angle to the radial line of the work, rack or segment of gear to be cut, due to the tilted position of the work as supported by the inclined saddle, consequently the milling cutters are made with their opposite cutting faces at unequal angles. The outer cutting faces are approximately at right angles to the axial line of the spindle 10, while the inner cutting faces are disposed at angles to conform to the inclination of the saddle or jig and the desired shape or form of the teeth to be cut. By thus tilting the saddle or jig, and the work supported thereby, an advantage is gained, among others, of providing a maximum of clearing space or room between the work and the opposite end of the cutter spindle 10, so that an unusually large driving gear 21 may be employed for rotating said cutter spindle. The inclined or tilted saddle offers the further advantage that it holds the work downwardly inclined and therefore permits gravity to assist in shifting the work when positioning the same to cut successive teeth, thus providing a time saving factor, when cutting very large and heavy racks or gears. Various means are employed for holding the work rigidly supported upon the jig or saddle during the cutting operations, which will be more particularly pointed out in connection with the following brief description of the manner of using and operating the machine.

Before placing the segment 40 into the saddle or jig, the positions of the teeth to be cut therein are laid out for pitch; a small center-punch mark P being made at the center of each tooth position on the pitch line. Being thus marked or laid out the segment 40 is lifted at one end by a suitable tackle 45, and then placed in the saddle or jig being permitted to slide down therein until the first tooth position is alined with the milling cutter (the finishing cutter being secured to the cutting spindle 10 in place of the roughing cutters, so as to provide an accurate basis to work from) by the use of a straight edge working from the outer face of the cutter. The saddle 39 is provided with a series of openings 46 with one of which (located near the lower end of the segment 40) is arranged a thrust block 47 having a toe portion 48 for insertion through and engagement with the underside of the saddle to hold said thrust block immovably fixed against the thrust of the segment 40. An adjusting screw 49 is threaded through said thrust block and is screwed home against the lower end of the segment. By turning said screw 49 to thrust upon or slack away from the end of said segment, as may be necessary, the latter may be exactly alined with its first tooth position properly set to the milling cutter position. The segment is further secured against displacement during the cutting operation by means of a transverse clamp-strap 50 secured by nuts 51 upon screw threaded studs 52 projecting upwardly from the edges of said side flanges of the saddle. If desired springs 53 may be inserted beneath the clamp strap and said nuts 51, which are compressed by screwing down said nuts, but which lift the strap when said nuts are slacked off.

If additional holding means against downward slip of the segment 40 is desired, a yoke 54 pivoted to said saddle to bridge over said segment 40 may be employed, said yoke carrying an adjustable set screw 55 which may thrust against the face of the segment or the face of a tooth which has been previously roughed out therein.

It may also be here pointed out that as successive teeth are cut and the segment 40 is shifted down through the saddle and beyond the lower end of the latter, so that the thrust block 47 can no longer be employed, a similar pivoted yoke 56 connected with the lower end of said saddle is provided, the same carrying an adjustable set screw 57, which may be set up against the face of tooth to take the thrust of the segment.

In order to provide a quick and easy method of adjusting the segment to the cutters for successive teeth cutting operations I provide a tram such as is illustrated in Figures 5 and 6 of the drawings. This tram comprises a longitudinal bar 60 of suitable length having at one end a fixed projecting point 61 and at the other end a pivoted member 62 having extending from one side of its fulcrum a point 63 and from the opposite side of its fulcrum a pointer member 64. Also fixed to said bar so as to be located back of said pointer member 64 is scale plate 65 having a zero mark with which the pointer member may be registered. After the segment 40 has been set and secured for the initial cut, the point 61 of the tram is placed on the center-punch mark of the nearest tooth outside of the milling cutter. The pointer member 64 of the point 63 is then registered with the zero mark of the scale plate 65, and a scratch or mark is made with said point 63 upon the edge of said saddle or upon a location pin 66 fixed in said edge, and a center-punch mark upon said location pin 66 is established on the center of said scratch or mark, the tram is then tried with its points in the center-punch mark of the work and the center-punch mark on the location pin 66 to assure the operator that the pointer member points exactly to zero when the tram is so arranged. In this manner a fixed point on the saddle is established from which to measure the amount of longitudinal shift to be permitted to the segment when adjusting the same to cut successive teeth. After the marked location pin 66, or similar fixed point, has been established, the finishing cutter is removed from the cutter spindle 10 and the roughing cutters 22 and 23 are secured upon the spindle. The machine is now ready for work and the first roughing cut may be proceeded with. The power is turned on and the motor rotates the cutter spindle and its cutters, at the same time the carriage feeds forward to carry the cutters transversely across the segment 40 until the width of the segment has been cut through.

After the cut has been completed, the driver gear 34 of said feed spindle 32 is loosened from driven relation to said feed spindle, by slacking off the nut 34' which normally serves to bind said driven gear against a shoulder or collar 34" on said feed spindle, thus stopping the feed transmission by permitting the feed spindle to run idly or free. The carriage now comes to a stop. The carriage may thereupon be run back or retracted to normal initial or starting position by loosening the clamp cap 26 to permit the feed screw 24 to be rotated, thus causing the feed nut formed by the hub 28 to travel rearwardly thereupon and thereby pushing back the carriage 6 to normal initial position. The feed screw 24 may be rotated either by a hand crank (not shown) attached to its squared end 24', or by a suitable power means coupled thereto if desired.

The carriage 6 with the cutters 22 and 23 being returned to normal initial position, the segment 40 is loosened from bound relation to the saddle and allowed to slide downwardly in the latter. The approximate amount of shifting movement of the segment is first permitted, and then the same is held in such roughly adjusted position by the set screw 49 of the thrust block 47. The final adjusting movement of the segment is then determined with the aid of the above described tram. The point 61 of said tram is placed in the next rearwardly spaced center-punch mark and the point 63 is placed on the center-punch mark of the fixed location pin 66. The segment 40 is then shifted slightly in the direction required to bring the pointer member 64 exactly on the zero mark of the scale plate 65, (as indicated in Figure 7 of the drawings), whereupon the segment 40 is again securely fastened to the saddle, and the cutting operation, as above described is repeated. When half of the segment 40 has been cut, the next segment is placed in the saddle in abutting relation against the unfinished end of the segment being cut, and the same being at the higher or upwardly tilted end of said saddle, adds its weight to the first segment to aid in pushing by gravity the latter forward for resetting as each successive tooth is cut. When the first segment is finshed, and the first few cuts have been made in the second segment, said first segment may be removed from the machine, and the operators thus proceed with the successive segments until all have received the required rough cuts. When the last segment is about finished, the first segment is again placed behind the same, and when its first tooth is reached, the roughing cutters 22 and 23 are removed from the cutter spindle 10, and a finishing cutter (not shown) fitted on said spindle 10. The operations are then proceeded with in the manner above described until all the teeth of the several segments have received a final finishing cut to accurately reduce the teeth to the desired face form and final dimensions desired. It will be understood, of course, that in some classes of work it is possible to produce a finished tooth in one cut, so that I do not necessarily limit the method of operation, or the construction of the machine, to the practice of making first roughing cuts and then final finishing cuts.

It will be clearly evident that the machine may be adapted to operate upon work of various longitudinal shapes by conforming the longitudinal shape of the saddle thereto.

From the above description it will be apparent that I have provided a very simple, yet highly efficient, accurate and durable gear and rack cutting machine, which while it may be constructed in size to handle any kind of work from small sizes to extra large sizes, is peculiarly efficient and well adapted to rapidly handle extra large and heavy work.

I am aware that some changes may be made in the construction of the machine above described, both with respect to the general arrangements and combinations of parts, as well as with respect to the details of the construction thereof, without departing from the scope and general principles of my invention as described in the foregoing specification and as defined in the following claims. Hence, I do not limit my invention to the exact arrangements and combinations of parts as described in the foregoing specification, nor do I confine myself to the exact details of the construction of the various parts as illustrated in the accompanying drawings.

I claim:—

1. In a machine of the kind described, a bed member, a carriage mounted to travel back and forth thereon, a transverse cutter spindle mounted on said carriage, a suitably shaped milling cutter on one end of said spindle, a work supporting saddle secured to said bed member so as to extend transversely beneath said carriage, the disposition of said saddle relative to the axial line of said cutter spindle being such that the work diverges longitudinally from the point of contact with said milling cutter toward and away from the opposite end of said cutter spindle, a comparatively large driving gear on said opposite end of said cutter spindle, means co-operating with said driving gear for rotating said cutter spindle, and means for causing a forward feeding movement of said carriage.

2. In a machine of the kind described, a bed-member, a carriage mounted to travel back and forth thereon, a transverse cutter spindle mounted on said carriage, a suitably shaped milling cutter on one end of said spindle, said bed-member having a transverse gap extending therethrough beneath said carriage, a work supporting saddle fixed to said bed-member to extend through said gap, said saddle being disposed in an inclined position to extend downwardly past said milling cutter in the direction of the opposite end of said cutter spindle, means for locking and adjusting the work on said saddle in operative relation to said milling cutter, a comparatively large driving gear on said opposite end of said cutter spindle, means cooperating with said driving gear for rotating said cutter spindle, and means for causing a forward feeding movement of said carriage.

3. In a machine of the kind described, a bed-member, a carriage mounted to travel back and forth thereon, a transverse cutter spindle mounted on said carriage, a suitably shaped milling cutter on one end of said spindle, said bed-member having a transverse gap extending therethrough beneath said carriage, a work supporting saddle fixed to said bed-member to extend through said gap, said saddle being disposed in an inclined position to extend downwardly past said milling cutter in the direction of the opposite end of said cutter spindle, means for locking and adjusting the work on said saddle in operative relation to said milling cutter, a comparatively large driving gear on said opposite end of said cutter spindle, means co-operating with said driving gear for rotating said cutter spindle, means for causing a forward feeding movement of said carriage, comprising a feed screw in fixed relation to said bed-member, a rotatable feed nut means mounted on said carriage and operatively engaged with said feed screw, and transmission means between said cutter spindle and said feed nut means for rotating the latter.

4. In a machine of the kind described, a bed-member, a carriage mounted to travel back and forth thereon, a transverse cutter spindle mounted on said carriage, a suitably shaped milling cutter on one end of said spindle, said bed-member having a transverse gap extending therethrough beneath said carriage, a work supporting saddle having side flanges to form a seat for the work so that the latter is movable longitudinally therethrough, said saddle being disposed in an inclined or tilted angular relation to the axial line of said cutter spindle to extend through said gap downwardly past said milling cutter in the direction of and diverging from the opposite end of said cutter spindle, means for securing said saddle to said bed-member, means for locking and adjusting the work on said saddle in operative relation to said milling cutter, a comparatively large driving gear on said opposite end of said cutter spindle, a motor supported on said carriage, transmission means intermediate said motor and said cutter spindle driving gear, and means for causing a forward feeding movement of said carriage.

5. In a machine of the kind described, a bed-member, a carriage mounted to travel back and forth thereon, a transverse cutter spindle mounted on said carriage, a suitably shaped milling cutter on one end of said spindle, said bed-member having a transverse gap extending therethrough beneath said carriage, a work supporting saddle having side flanges to form a seat for the work so that the latter is movable longitudinally therethrough, said saddle being disposed in an inclined or tilted angular relation to the axial line of said cutter spindle to extend through said gap downwardly past said milling cutter in the direction of and diverging from the opposite end of said cutter spindle, means for securing said saddle to said bed-member, means for locking and adjusting the work on said saddle in operative relation to said milling cutter, a comparatively large driving gear on said opposite end of said cutter spindle, a motor supported on said carriage, transmission means intermediate said motor and said cutter spindle driving gear, means for causing a forward feeding movement of said carriage, comprising a feed screw in fixed relation to said bed-member, a rotatable feed nut means mounted on said carriage and operatively engaged with said feed screw, and transmission means between said cutter spindle and said feed nut means for rotating the latter.

6. In a machine of the kind described, a bed-member, a carriage mounted to travel back and forth thereon, a transverse cutter spindle mounted on said carriage, a suitably shaped milling cutter on one end of said spindle, said bed-member having a transverse gap extending therethrough beneath said carriage, a work supporting saddle having side flanges to form a seat for the work so that the latter is movable longitudinally therethrough, said saddle being disposed in an inclined or tilted angular relation to the axial line of said cutter spindle to extend through said gap downwardly past said milling cutter in the direction of and diverging from the opposite end of said cutter spindle, means for securing said saddle to said bed-member, means for locking and adjusting the work on said saddle in operative relation to said milling cutter, a comparatively large driving gear on said opposite end of said cutter spindle, a motor supported on said carriage, transmission means intermediate said motor and said cutter spindle driving gear, means for causing a forward feeding movement of said carriage, comprising a feed screw in fixed relation to said bed-member, a rotatable feed nut means mounted on said carriage, a feed spindle mounted on said carriage in geared relation to said cutter spindle, and a train of transmission gears intermediate said feed spindle and said rotatable feed nut means.

7. In a machine of the kind described, a bed-member, a carriage mounted to travel back and forth thereon, a transverse cutter spindle mounted on said carriage, a suitably shaped milling cutter on one end of said spindle, said bed-member having a transverse gap extending therethrough beneath said carriage, a work supporting saddle having side flanges to form a seat for the work so that the latter is movable longitudinally therethrough, said saddle being disposed in an inclined or tilted angular relation to the axial line of said cutter spindle to extend through said gap downwardly past said milling cutter in the direction of and diverging from the opposite end of said cutter spindle, means for securing said saddle to said bed-member, means for locking and adjusting the work on said saddle in operative relation to said milling cutter, a comparatively large driving gear on said opposite end of said cutter spindle, a motor supported on said carriage, transmission means intermediate said motor and said cutter spindle driving gear, means for causing a forward feeding movement of said carriage, comprising a feed screw in fixed relation to said bed-member, a rotatable feed nut means mounted on said carriage, a feed spindle mounted on said carriage in geared relation to said cutter spindle, a train of transmission gears intermediate said feed spindle and said rotatable feed nut means, means for disconnecting said transmission gears from driven relation to said feed spindle, and means releasing said feed screw for rotation whereby said carriage may be retracted to normal initial position.

8. In a machine of the kind described, a bed-member, a carriage mounted to travel back and forth thereon, a rotary milling cutter mechanism supported by said carriage, and a work supporting saddle fixed to said bed-member to extend transversely beneath said carriage in downwardly inclined or tilted relation toward and past the cutter of said milling cutter mechanism.

9. In a machine of the kind described, a bed-member, a carriage mounted to travel back and forth thereon, a rotary milling cutter mechanism supported by said carriage, a work supporting saddle fixed to said bed-member to extend transversely beneath said carriage in downwardly inclined or tilted relation toward and past the cutter of said milling cutter mechanism, means for locking and adjusting the work on said saddle in operative relation to said milling cutter mechanism, a fixed location point on said saddle, and a tram for co-operation with predetermined marks on the work and said fixed location point whereby properly adjusted position of the work relative to the milling cutter mechanism may be determined.

10. In a machine of the kind described, a bed-member, a carriage mounted to travel back and forth thereon, a transverse cutter spindle mounted on said carriage, a suitably shaped milling cutter on one end of said spindle, said bed-member having a transverse gap extending therethrough beneath said carriage, a work supporting saddle fixed to said bed-member to extend through said gap, said saddle being disposed in an inclined position to extend downwardly past said milling cutter in the direction of the opposite end of said cutter spindle, means for locking and adjusting the work on said saddle in operative relation to said milling cutter, a fixed location point on said saddle, a tram for co-operation with predetermined marks on the work and said fixed location point whereby properly adjusted position of the work relative to said milling cutter may be determined, a comparatively large driving gear on said opposite end of said cutter spindle means co-operating with said driving gear for rotating said cutter spindle, and means causing a forward feeding movement of said carriage.

11. In a machine of the kind described, a bed-member, a carriage mounted to travel back and forth thereon, a transverse cutter spindle mounted on said carriage, a suitably shaped milling cutter on one end of said spindle, said bed-member having a transverse gap extending therethrough beneath said carriage, a work supporting saddle fixed to said bed-member to extend through said gap, said saddle being disposed in an inclined position to extend downwardly past said milling cutter in the direction of the opposite end of said cutter spindle, means for locking and adjusting the work on said saddle in operative relation to said milling cutter, a fixed location point on said saddle, a tram for co-operation with predetermined marks on the work and said fixed location point whereby properly adjusted position of the work relative to said milling cutter may be determined, a comparatively large driving gear on said opposite end of said cutter spindle, means co-operating with said driving gear for rotating said cutter spindle, and means causing a forward feeding movement of said carriage, comprising a feed screw in fixed relation to said bed-member, a rotatable feed nut means mounted on said carriage and operatively engaged with said feed screw, and transmission means between said cutter spindle and said feed nut means for rotating the latter.

12. In a machine of the kind described, a bed-member, a carriage mounted to travel back and forth thereon, a transverse cutter spindle mounted on said carriage, a suitably shaped milling cutter on one end of said spindle, said bed-member having a transverse gap extending therethrough beneath said carriage, a work supporting saddle having side flanges to form a seat for the work so that the latter is movable longitudinally therethrough, said saddle being disposed in an inclined or tilted angular relation to the axial line of said cutter spindle to extend through said gap downwardly past said milling cutter in the direction of and diverging from the opposite end of said cutter spindle, means for securing said saddle to said bed-member, means for locking and adjusting the work on said saddle in operative relation to said milling cutter, a fixed location point on said saddle, a tram for co-operation with predetermined marks on said work and said fixed location point whereby properly adjusted position of the work relative to the milling cutter may be determined, a comparatively large driving gear on said opposite end of said cutter spindle, a motor supported on said carriage, transmission means intermediate said motor and said cutter spindle driving gear, and means for causing a forward feeding movement of said carriage.

13. In a machine of the kind described, a bed-member, a carriage mounted to travel back and forth thereon, a transverse cutter spindle mounted on said carriage, a suitably shaped milling cutter on one end of said spindle, said bed-member having a transverse gap extending therethrough beneath said carriage, a work supporting saddle having side flanges to form a seat for the work so that the latter is movable longitudinally therethrough, said saddle being disposed in an inclined or tilted angular relation to the axial line of said cutter spindle to extend through said gap downwardly past said milling cutter in the direction of and diverging from the opposite end of said cutter spindle, means for securing said saddle to said bed-member, means for locking and adjusting the work on said saddle in operative relation to said milling cutter, a fixed location point on said saddle, a tram for co-operation with predetermined marks on said work and said fixed location point whereby properly adjusted position of the work relative to the milling cutter may be determined, a comparatively large driving gear on said opposite end of said cutter spindle, a motor supported on said carriage, transmission means intermediate said motor and said cutter spindle driving gear, means for causing a forward feeding movement of said carriage, comprising a feed screw in fixed relation to said bed-member, a rotatable feed nut means mounted on said carriage and operatively engaged with said feed screw, and transmission means between said cutter spindle and said feed nut means for rotating the latter.

14. In a machine of the kind described, a bed-member, a carriage mounted to travel back and forth thereon, a transverse cutter spindle mounted on said carriage, a suitably shaped milling cutter on one end of said spindle, said bed-member having a transverse gap extending therethrough beneath said carriage, a work supporting saddle having side flanges to form a seat for the work so that the latter is movable longitudinally therethrough, said saddle being disposed in an inclined or tilted angular relation to the axial line of said cutter spindle to extend through said gap downwardly past said milling cutter in the direction of and diverging from the opposite end of said cutter spindle, means for securing said saddle to said bed-member, means for locking and adjusting the work on said saddle in operative relation to said milling cutter, a fixed location point on said saddle, a tram for co-operation with predetermined marks on said work and said fixed location point whereby properly adjusted position of the work relative to the milling cutter may be determined, a comparatively large driving gear on said opposite end of said cutter spindle, a motor supported on said carriage, transmission means intermediate said motor and said cutter spindle driving gear, means for causing a forward feeding movement of said carriage, comprising a feed screw in fixed relation to said bed-member, a rotatable feed nut means mounted on said carriage, a feed spindle mounted on said carriage in geared relation to said cutter spindle, and a train of transmission gears intermediate said feed spindle and said rotatable feed nut means.

15. In a machine of the kind described, a bed-member, a carriage mounted to travel back and forth thereon, a transverse cutter spindle mounted on said carriage, a suitably shaped milling cutter on one end of said spindle, said bed-member having a transverse gap extending therethrough beneath said carriage, a work supporting saddle having side flanges to form a seat for the work so that the latter is movable longitudinally therethrough, said saddle being disposed in an inclined or tilted angular relation to the axial line of said cutter spindle to extend through said gap downwardly past said milling cutter in the direction of and diverging from the opposite end of said cutter spindle, means for securing said saddle to said bed-member, means for locking and adjusting the work on said saddle in operative relation to said milling cutter, a fixed location point on said saddle, a tram for cooperation with predetermined marks on said work and said fixed location point whereby properly adjusted position of the work relative to the milling cutter may be determined, a comparatively large driving gear on said opposite end of said cutter spindle, a motor supported on said carriage, transmission means intermediate said motor and said cutter spindle driving gear, means for causing a forward feeding movement of said carriage, comprising a feed screw in fixed relation to said bed-member, a rotatable feed nut means mounted on said carriage, a feed spindle mounted on said carriage in geared relation to said cutter spindle, a train of transmission gears intermediate said feed spindle and said rotatable feed nut means, means for disconnecting said transmission gears from driven relation to said feed spindle, and means releasing said feed screw for rotation whereby said carriage may be retracted to normal initial position.

16. In a machine of the kind described, a bed-member, a carriage mounted to travel back and forth thereon, a rotary milling cutter mechanism supported by said carriage, means for driving said milling cutter mechanism, a work supporting saddle fixed to said bed-member to extend transversely beneath said carriage in downwardly inclined or tilted relation toward and past the cutter of said milling cutter mechanism, and means for causing a forward feeding movement of said carriage.

17. In a machine of the kind described, a bed-member, a carriage mounted to travel back and forth thereon, a rotary milling cutter mechanism supported by said carriage, means for driving said milling cutter mechanism, a work supporting saddle fixed to said bed-member to extend transversely beneath said carriage in downwardly inclined or tilted relation toward and past the cutter of said milling cutter mechanism, means for causing a forward feeding movement of said carriage, comprising a feed screw in fixed relation to said bed-member, a rotatable feed nut means mounted on said carriage, and transmission mechanism intermediate said milling cutter mechanism and said feed nut means.

18. In a machine of the kind described, a bed-member, a carriage mounted to travel back and forth thereon, a rotary milling cutter mechanism supported by said carriage, means for driving said milling cutter mechanism, a work supporting saddle fixed to said bed-member to extend transversely beneath said carriage in downwardly inclined or tilted relation toward and past the cutter of said milling cutter mechanism, means for causing a forward feeding movement of said carriage comprising a feed screw in fixed relation to said bed-member, a rotatable feed nut means mounted on said carriage, a feed spindle mounted on said carriage in geared relation to said milling cutter mechanism, and a train of transmission gears intermediate said feed spindle and said rotatable feed nut means.

19. In a machine of the kind described, a bed-member, a carriage mounted to travel back and forth thereon, a rotary milling cutter mechanism supported by said carriage, means for driving said milling cutter mechanism, a work supporting saddle fixed to said bed-member to extend transversely beneath said carriage in downwardly inclined or tilted relation toward and past the cutter of said milling cutter mechanism, means for causing a forward feeding movement of said carriage, comprising a feed screw in fixed relation to said bed-member, a rotatable feed nut means mounted on said carriage, a feed spindle mounted on said carriage in geared relation to said milling cutter mechanism, a train of transmission gears intermediate said feed spindle and said rotatable feed nut means, means for disconnecting said transmission gears from driven relation to said feed spindle, and means releasing said feed screw for rotation whereby said carriage may be retracted to normal initial position.

20. In a machine of the kind described a rotary milling cutter mechanism, means for feeding forward said rotary milling cutter mechanism, and a downwardly inclined or tilted work supporting saddle fixed transversely of the feeding movement of and extending beneath said milling cutter mechanism through which the work may be longitudinally shifted.

21. In a machine of the kind described a rotary milling cutter mechanism, means for feeding forward said rotary milling cutter mechanism, a downwardly inclined or tilted work supporting saddle fixed transversely of the feeding movement of and extending beneath said milling cutter mechanism through which the work may be longitudinally shifted, and means for locking and adjusting the work in said saddle in operative relation to said milling cutter mechanism.

22. In a machine of the kind described a rotary milling cutter mechanism, means for feeding forward said rotary milling cutter mechanism, a downwardly inclined or tilted work supporting saddle fixed transversely of the feeding movement of and extending beneath said milling cutter mechanism through which the work may be longitudinally shifted, means for locking and adjusting the work in said saddle in operative relation to said milling cutter mechanism, a fixed location point on said saddle, and a tram for co-operation with predetermined marks on the work and said fixed location point whereby properly adjusted position of the work relative to the milling cutter mechanism may be determined.

In testimony that I claim the invention set forth above I have hereunto set my hand this twenty-third day of June, 1920.

HANS F. JORGENSEN.

Witnesses:
ETHEL A. KIMPTON,
W. H. PASHLEY.